Nov. 23, 1965 B. D. LOUGHLIN 3,219,760

MONO-STEREO CONTROL APPARATUS FOR FM MULTIPLEX STEREO SIGNAL RECEIVER SYSTEM

Filed Feb. 26, 1962 2 Sheets-Sheet 1

United States Patent Office 3,219,760

Patented Nov. 23, 1965

3,219,760
MONO-STEREO CONTROL APPARATUS FOR FM MULTIPLEX STEREO SIGNAL RECEIVER SYSTEM

Bernard D. Loughlin, Huntington, N.Y., assignor to Hazeltine Research, Inc., a corporation of Illinois

Filed Feb. 26, 1962, Ser. No. 175,736
2 Claims. (Cl. 179—15)

This invention relates to circuits which automatically "kill" or disable the stereo circuits of a stereo receiver or stereo adapter during monophonic reception, thereby improving the signal-to-noise ratio during monophonic reception. In accordance with the invention, there may also be provided an indicator which automatically indicates the reception of a stereo signal.

Subject matter disclosed herein and jointly invented by Bernard D. Loughlin and Emmet J. Duffy forms the subject matter of divisional application Serial No. 317,661, filed October 21, 1963.

In its limited sense, the phrase "FM stereo" is one used in the industry to refer to the FM-AM multiplex broadcast signal complying with the standards on stereophonic signal broadcasting recently adopted by the Federal Communications Commission. In this form of an FM stereo signal, left and right channel signals L and R are added together to form an audio-frequency sum signal $(L+R)$ which frequency-modulates the transmitted carrier signal. As such, the transmitted signal is essentially the same as a monophonic FM broadcast signal. Therefore, additional components are necessary to be added to the transmitted signal for stereo reception. The first of these is an audio-frequency difference signal $L-R$, which amplitude-modulates a subcarrier of 38 kc. The 38 kc. subcarrier is suppressed and the remaining $L-R$ sideband modulation components, lying in a frequency range above the $L+R$ signal, frequency-modulate the transmitted carrier. In addition, a 19 kc. continuous wave signal, serving as a pilot subcarrier, frequency-modulates the transmitted carrier, this pilot subcarrier lying between the $L+R$ signal and the $L-R$ modulation components.

However, for the purpose of the present specification and claims, the phrase "stereo signal" is intended to apply to any stereophonic broadcast signal in which additional signal components are added for the purpose of stereo reception, and it is not intended to have the more restricted meaning it presently has in the broadcast receiver industry.

When an FM stereo receiver is used to receive monophonic signals, the signal-to-noise ratio may be as much as 20 db poorer than would be the case if the stereo circuits were removed and the receiver functioned as a conventional monophonic receiver. Hence, it is desirable to disable or "kill" the stereo circuits of stereo receivers during monophonic reception in order to improve the signal-to-noise ratio. The circuits described herein can be used in either FM stereo receivers or in FM stereo adapters and the phrase FM stereo receiver system is intended to apply to both cases.

In addition to the function of stereo killing, another desirable feature for stereo receivers is an indicator which will automatically show the reception of a stereo signal. Frequently when a person is tuning to a signal, it is not immediately apparent which type of signal is being received, especially when the tuner is close to one speaker location and somewhat remote from the other. As will be seen, the two automatic functions of stereo-killing and indication of stereo signal reception are conveniently combined in the circuits described herein.

It is, therefore, an object of the present invention to provide apparatus for automatically controlling stereo circuits in an FM stereo receiver system.

It is also an object of the present invention to provide an indication of stereo reception when such is the case.

Thus, in accordance with the invention, there is provided for use in a broadcast stereo signal receiver system apparatus for controlling the operation of a carrier-injecting oscillator included in the stereo circuits thereof comprising means for deriving a signal representative of the presence or absence of stereo signals in a received broadcast signal. The apparatus also includes means responsive to the aforementioned signal for deriving therefrom a variable loading effect capable of damping-out oscillations in the resonant circuit of the oscillator in the absence of a received stereo signal and for otherwise enabling the oscillations. The apparatus also includes means for applying the control effect to the resonant circuit.

For a better understanding of the present invention, together with other and further objects thereof, reference is had to the following description, taken in connection with the accompanying drawings, and its scope will be pointed out in the appended claims.

Referring to the drawings.

Figures 1, 2:
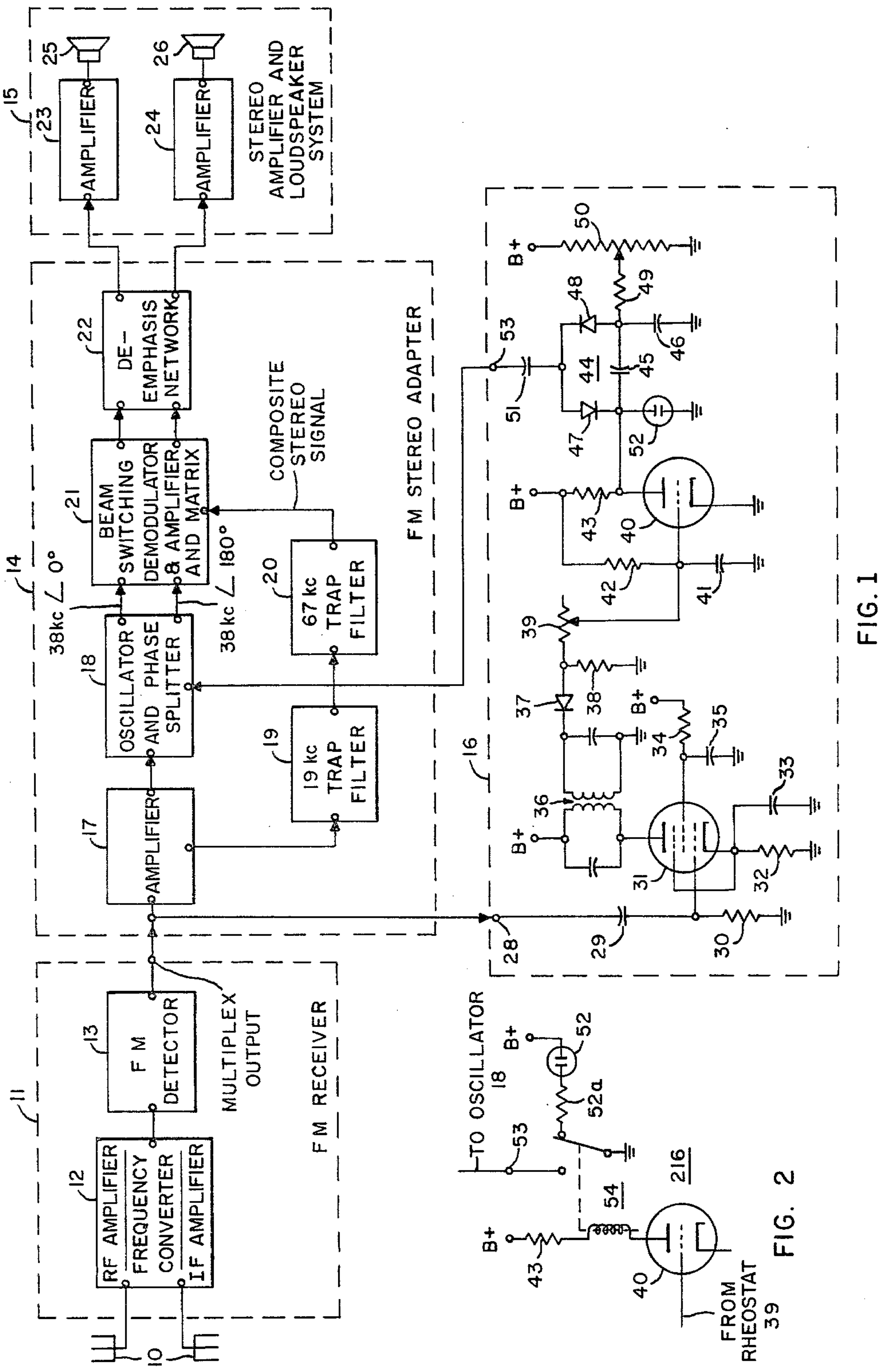
FIG. 1 is a diagram, partly schematic, of an FM stereo receiver system embodying control apparatus in accordance with one form of the present invention.
FIG. 2 is a modified form of control apparatus useful in the receiver system of FIG. 1.

*FIG. 1 receiver system*

There is shown in FIG. 1 an FM receiver system adapted for compatible reception of either a conventional FM broadcast signal or an FM stereo signal, the latter of which may be of the aforedescribed type approved by the Federal Communications Commission. As shown, the system comprises an antenna 10, a conventional FM receiver 11, an FM stereo adapter 14, and a stereo amplifier and loudspeaker system 15. In addition, control apparatus 16, to be described in detail hereinafter, is coupled to adapter 14 for controlling the stereo circuits therein in accordance with the present invention. Receiver 11 includes the usual radio-frequency (RF) amplifier, frequency converter, and intermediate-frequency (IF) amplifier circuits 12, the output of which is coupled to an FM detector 13 which may be of any well-known type. The multiplex output of receiver 11, i.e. an output terminal located prior to the usual de-emphasis circuit (not shown) is connected to the input of adapter 14.

Adapter 14 is of the type utilizing a local oscillator synchronized by the 19 kc. pilot subcarrier to provide a 38 kc. switching signal for demodulation of the stereo subcarrier signal. More specifically, adapter 14 includes an amplifier 17 for amplifying the composite stereo signal and for separating out the 19 kc. pilot subcarrier signal for application to an oscillator and phase splitter circuit 18. The composite stereo signal is passed through a 19 kc. filter 19 for preventing translation of the pilot subcarrier and a 67 kc. filter 20 for preventing translation of the 67 kc. SCA (e.g. storecast) subcarrier and its adjacent modulation components to a beam-switching demodulator and amplifier and matrix unit 21. Unit 21 is presently well known in the art. Specifically, it may be of the type shown at page 20 of the June 1961 issue of Audio Magazine. The demodulated left and right channel signals at the demodulator-matrix unit 21 are then applied through a de-emphasis network 22 for application to system 15 including amplifiers 23, 24 and left and right loudspeakers 25 and 26, respectively.

The oscillator 18 may, in fact, comprise a 19 kc. oscillator having a resonant tank circuit directly synchronized by the 19 kc. pilot subcarrier and with a 38 kc. tuned circuit in the output thereof for selecting and applying the second harmonic of the 19 kc. oscillator signal to the phase splitter therein. As will become clear hereinafter, it is the function of the control apparatus 16 to control the operation of the stereo circuits in adapter 14 by damping out or not damping out the tank circuit in the oscillator portion of unit 18 in accordance with the absence or presence of the stereo signal respectively.

*Control apparatus 16 of FIG. 1*

Thus, in accordance with one form of the present invention, there is provided control apparatus 16 including means for deriving an electrical signal indicative of the presence or absence of stereo signals in a received FM broadcast signal. Such means may include amplifier tube 31, to which the composite signal from detector 13 is applied through input terminal 28 and coupling capacitor 29. The usual grid leak resistor 30, cathode biasing network 32, 33, and screen grid bias network 34, 35 are also included. A coupling transformer 36 is inserted in the anode circuit of tube 31 and is tuned to resonate at a frequency of 19 kc. A diode 37, resistor 38, sensitivity control rheostat 39, and capacitor 41 are coupled to the output of transformer 36, and constitute a detector circuit to provide either of two voltage levels, depending on the presence or absence of the 19 kc. pilot subcarrier at the ouput of FM detector 13. The output of this detector circuit is applied to the control grid of a D.-C. amplifier, conventionally including tube 40, grid biasing resistor 42, and an anode load 43. The value of resistor 42 is such that it maintains the grid bias voltage of tube 40 near ground potential in the absence of a stereo signal.

Control apparatus 16 also includes means such as electronic switch 44, responsive to the aforementioned electrical signal which, in this example, is the amplified voltage levels at the anode of tube 40, for deriving therefrom a control effect capable of disabling operation of the stereo circuits in the receiver system in the absence of a received stereo signal and for otherwise enabling operation thereof. Electronic switch 44 includes diodes 47 and 48, coupled in series from the anode of tube 40 through resistor 49 to the movable tap of a voltage-divider potentiometer 50. A capacitor 45 is coupled across diodes 47, 48 and capacitor 46 is coupled from the anode of diode 48 to ground.

Means for applying the control effect developed by electronic switch 44 to the stereo circuits includes capacitor 51, coupled from the common connection of diodes 47, 48 through output terminal 53, to one end of the aforementioned resonant tank circuit in oscillator 18. In addition, there is provided means such as neon indicator lamp 52, connected to the anode of tube 40 and responsive to the voltage levels on the anode for presenting a visual indication of the presence of the stereo signal and for stabilizing the control effect during one mode of its operation.

The operation of control apparatus 16 is as follows. During monophonic reception the entire output of detector 13 is applied to input terminal 28; however, since there is no 19 kc. pilot subcarrier signal present, no signal will appear at the plate of tube 31. This is because the plate load, i.e. transformer 36, is tuned to 19 kc. The grid of tube 40 will be close to zero potential, causing substantial current conduction. The plate of tube 40 will, therefore, be at some low voltage below the extinction potential of neon indicator lamp 52, which consequently will be out. Potentiometer 50 is adjusted so that the voltage at the movable tap is higher than the aforementioned plate voltage to tube 40, but lower than the maintaining potential of neon lamp 52. It is preferably adjusted to a point midway between the two values. Thus, since they are forward biased, current will flow through diodes 47 and 48, and the tank circuit of oscillator 18 will be heavily loaded by the loading circuit composed of capacitors 51, 45, and 46.

During stereo reception, a 19 kc. pilot subcarrier appears (along with other signal components) at input terminal 28 and is selected and amplified by the amplifier circuit of tube 31. It is then rectified by diode 37, producing a negative bias at the grid of tube 40 sufficient to raise the plate potential of tube 40 to the striking voltage of the indicator lamp 52. When the lamp lights, the plate voltage will then drop to the maintaining voltage of the lamp which, as previously indicated, is higher than the voltage at the movable tap of potentiometer 50. Diodes 47 and 48, in series, will then be reverse biased, rendering them nonconductive and thereby removing the loading across the tank circuit of oscillator 18. This enables oscillator 18 to operate in its normal manner for stereo reception. At the same time, the lighting of lamp 52 gives an automatic indication of the presence of a stereo signal which greatly simplifies tuning of the receiver for the listener.

It has been found that if the reverse-bias voltage across diodes 47 and 48 is allowed to vary, a phase shift may occur in oscillator 18. To counteract this, stereo indicator lamp 52 is connected to the plate of tube 40 to act as a voltage regulator and thereby maintain a constant reverse-bias across the diodes for varying input signals, thereby preventing oscillator phase shift.

While applicant does not wish to be limited to any particular set of circuit constants, the following have proved useful in the circuit of FIG. 1:

| | |
|---|---|
| Resistor **30** | 470 kilohms. |
| Resistor **32** | 150 ohms. |
| Resistor **34** | 47 kilohms. |
| Resistor **38** | 470 kilohms. |
| Resistor **42** | 2.2 megohms. |
| Resistor **43** | 220 kilohms. |
| Resistor **49** | 220 kilohms. |
| Rheostat **39** | 100 kilohms (max.). |
| Potentiometer **50** | 100 kilohms (max.). |
| Capacitor **29** | 5000 picofarads. |
| Capacitor **33** | 4 microfarads. |
| Capacitor **35** | 16 microfarads. |
| Capacitor **41** | 1.0 microfarad. |
| Capacitor **45** | 0.01 microfarad. |
| Capacitor **46** | 0.01 microfarad. |
| Capacitor **51** | 0.01 microfarad. |
| All diodes | Type 1N34. |
| Tube **31** | Type 6AU8 (pentode section). |
| Tube **40** | Type 6AU8 (triode section). |
| Transformer **36** | EL-RAD: X61–279 (with 6200 pf. across primary and secondary). |
| Lamp **52** | Type NE2. |
| Voltage supply B+ | 200 volts. |

In FIG. 2 there is shown an alternative form of control apparatus 216, which may also be used as a stereo-killer and indicator circuit. The electronic switch 44 and potentiometer 50 of FIG. 1 are replaced, in control apparatus 216, by an electromechanical relay 54, and neon indicator lamp 52 is connected to B+ and to the relay contact through a 220K. ohm resistor **52*a*, the circuitry being otherwise the same. Thus, during monophonic reception the bias at the grid of tube 40 will be close to zero potential and relay 54 will be energized, shorting-out the tank circuit in oscillator 18 of FIG. 1. During stereo reception a bias will be produced at the grid of tube 40, reducing the plate current and relay 54 will release, oscillator 18 will operate, and indicator lamp 52 will light, visually indicating to the listener the presence of a stereo signal. In an actually constructed embodiment of the FIG. 2 apparatus, a value of 12 kilohms was used for resistor 43 and a type XZ–366 relay, available from Comar Electric Co., was used for relay 54**.

Figure 3:
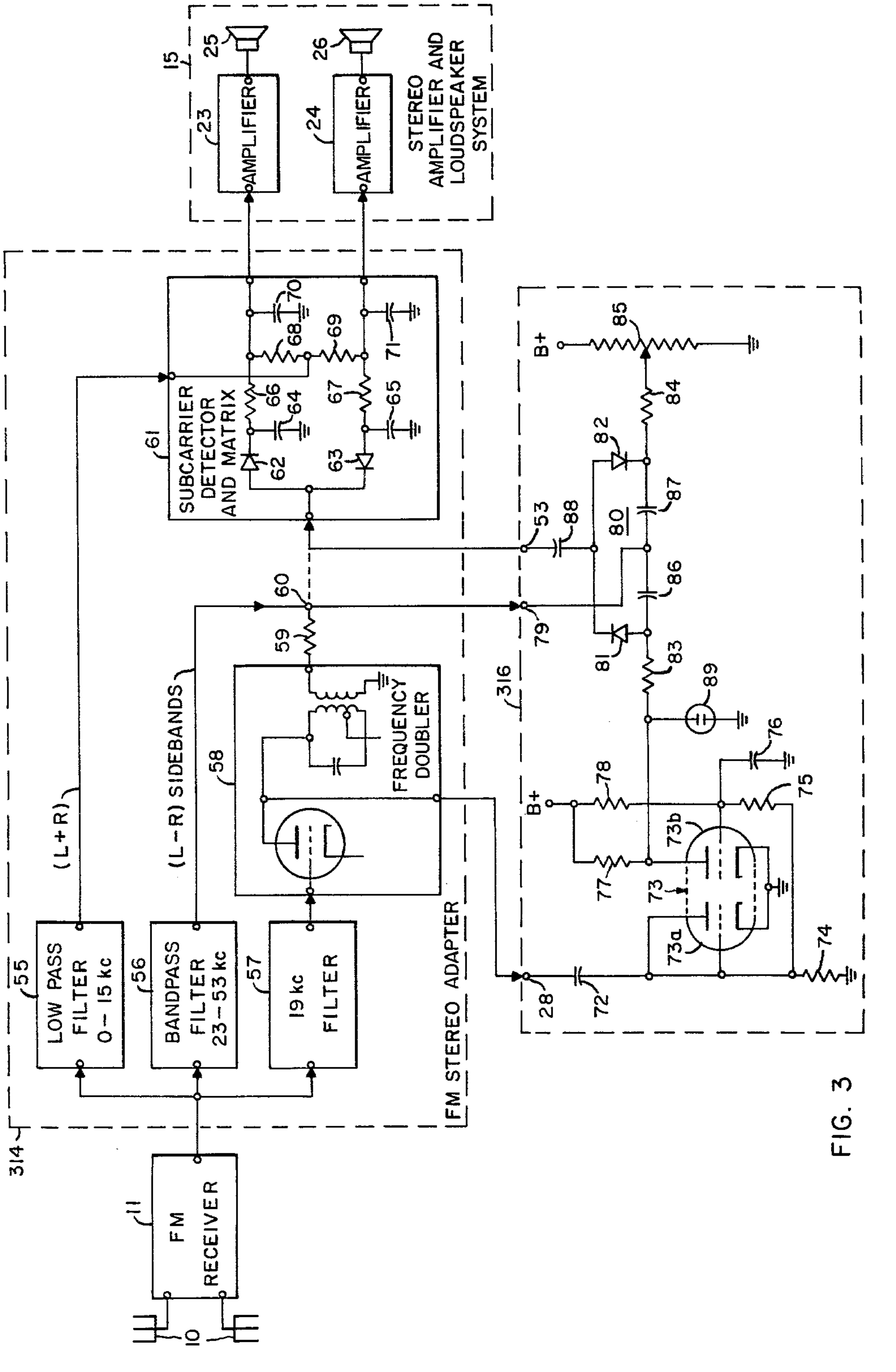
FIG. 3 is a further modification of control apparatus constructed in accordance with the present invention.

*FIG. 3 receiver system*

There is shown in FIG. 3 an FM stereo receiver system utilizing a different type of stereo adapter 314 and a modified control apparatus 316. Adapter 314 is of the type which employs a nonoscillating frequency doubler 58 to produce the 38 kc. subcarrier in place of the oscillator 18 of FIG. 1. As will be seen hereinafter in accordance with one form of the invention, control apparatus 316 disconnects the frequency doubler 58 and the (*L*—*R*) sideband-supply circuit 56 from the subcarrier detector and matrix 61 in the absence of a stereo signal and makes the connection in the presence of a stereo signal.

Considering the receiver system in general terms, antenna 10 and receiver 11 may be identical to the corresponding units of FIG. 1, as is also true with the stereo amplifier and loudspeaker system 15. In adapter 314 the low-frequency information signal (*L*+*R*) is separated out by filter 55 and applied to the matrix in unit 61 including resistors 68 and 69. The high-frequency (*L*—*R*) sidebands are separated out by filter 56 and applied to terminal 60, at which point the locally derived 38 kc. subcarrier from frequency doubler 58 is added via resistor 59 to produce a subcarrier signal amplitude-modulated by the signal (*L*—*R*). Frequency doubler 58 develops and amplifies the second harmonic of the 19 kc. pilot subcarrier which is separated from the received stereo signal by means of a narrow band-pass filter 57. Normally, the reconstituted (*L*—*R*) subcarrier signal would be connected to the detector input of unit 61, as shown by the dotted line connection. However, in accordance with the invention, it is supplied to input terminal 79 of control apparatus 316 for control purposes which will now be described.

*Control apparatus 316*

Although a nonoscillating frequency doubler circuit will inherently have less noise ouptut during monophonic recpetion than an oscillator circuit, significant further noise reduction may be obtained in receiver systems of this type by adding the control apparatus 316, which automatically disconnects the (*L*—*R*) circuit and the 38 kc. doubler circuit from the two detectors 62 and 63 during monophonic reception. A further benefit of control apparatus 316 is that by disconnecting the unit 61 detectors, clipping of the monophonic (*L*+*R*) signal is prevented, the monophonic output being somewhat higher in amplitude than the stereo output.

Considering now the description of control apparatus 316, it includes means responsive to, for example the 19 kc. pilot subcarrier, for deriving therefrom an indication of the presence or absence of stereo signals in the received broadcast signal. This means may include the connection from the plate of the tube in frequency doubler 58 through input terminal 28 and coupling capacitor 72 to the anode of one section **73*a*, connected as a diode, of twin diode 73. Resistor 74 is the diode load and the detected signal is coupled to the control grid of section 73*b*, connected as an amplifier, through resistor 75. Capacitor 76 is the rectifier circuit filter capacitor and resistor 78 maintains the section 73*b* grid potential close to zero in the absence of a 38 kc. signal from frequency doubler 58. Control apparatus 316 also includes means coupled in between terminal 60 and the detectors 62 and 63 and being responsive to the plate voltage of tube section 73*b* to couple the signal at terminal 60 to diodes 62 and 63 in the presence of a stereo signal and to uncouple said connection in the absence of a stereo signal. This means comprises electronic switch 80 including diodes 81 and 82, D.-C. coupled from the plate of tube section 73*b* to ground through an adjustable voltage divider 85 in a manner similar to switch 44 of FIG. 1, except that the polarity of the diode connections is reversed. In addition, a neon indicator lamp 89 is coupled to the plate of tube section 73*b***.

In operation and during monophonic reception, there will be no signal output from the 38 kc. frequency doubler 58. The grid of section **73*b* of tube 73 will be close to zero potential, the plate will be at a relatively low D.-C. voltage, and neon indicator lamp 89 will be out. Potentiometer 85 is adjusted to a potential midway between the aforementioned plate potential of tube section 73*b* and the maintaining potential of the neon lamp. Diodes 81 and 82, in series, will, therefore, be reverse-biased and the undesired noise signals at terminal 60 will be effectively disconnected from the two diode detectors 62 and 63, thereby preventing any noise from filter 56 or frequency doubler 58 from appearing at the input of audio amplifiers 23 and 24**. Furthermore, the diode detectors cannot clip the monophonic signal.

During stereo reception, a signal voltage will appear at the plate of the tube in the 38 kc. doubler circuit 58. This signal voltage will be rectified by section **73*a* of tube 73, connected as a diode, and will be applied to the grid of tube section 73*b*. The voltage at the plate of tube section 73*b* will rise to the striking potential of neon lamp 89 and then drop to the lamp's maintaining voltage. Forward current will then flow through diodes 81 and 82**, dropping their impedance to a low level, and the 38 kc. subcarrier signal and the (*L*—*R*) sidebands signal will be coupled to detector diodes 62 and 63. Resistors 83 and 84 are inserted to reduce the loading effect of the electronic switch.

It will be appreciated that the electromechanical switch of FIG. 2 may readily be substituted for the electronic switch 80 of FIG. 3, the details thereof being obvious and, therefore, no specific description being necessary. It will also be obvious that the switch may be located at a point subsequent to the subcarrier detectors, for example by employing a pair of switches, one in each channel. However, for a system such as is shown in FIG. 3, where the same amplifier and loudspeaker system is used for monophonic and stereophonic reception, it would be necessary to ensure that such a switch arrangement not be so located as to disable the monophonic circuits.

While applicant does not wish to be limited to any particular set of circuit constants, the following have proved useful in the circuit of FIG. 3:

| | |
|---|---|
| Resistor **74** | 470 kilohms. |
| Resistor **75** | 470 kilohms. |
| Resistor **77** | 220 kilohms. |
| Resistor **78** | 3.9 megohms. |
| Resistor **83** | 47 kilohms. |
| Resistor **84** | 47 kilohms. |
| Potentiometer **85** | 100 kilohms (max.). |
| Capacitor **72** | 330 picofarads. |
| Capacitor **76** | 0.1 microfarad. |
| Capacitor **86** | 0.1 microfarad. |
| Capacitor **87** | 0.1 microfarad. |
| Capacitor **88** | 0.1 microfarad. |
| Diodes **81, 82** | 1N67A. |
| Tube **73** | 12AT7. |
| Voltage supply B+ | 160 volts. |

While there have been described what are, at present, considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. For use in a broadcast stereo signal receiver system, apparatus for controlling the operation of a carrier-injecting oscillator included in the stereo circuits thereof comprising:

means for deriving a signal representative of the presence or absence of stereo signals in a received broadcast signal;

means responsive to said signal for deriving therefrom a variable loading effect capable of damping out oscillations in the resonant circuit of said oscillator in the absence of a received stereo signal and for otherwise enabling said oscillations;

and means for applying said control effect to said resonant circuit.

2. For use in a broadcast FM stereo signal receiver system, apparatus for controlling the operation of a carrier-injecting oscillator included in the stereo circuits thereof comprising:

first means including an amplifier circuit responsive to a signal component appearing only in a received FM stereo signal for providing a first voltage level representing the presence of said signal component and a second voltage level representing the absence of said signal component;

second means responsive to said first and second voltage levels for deriving therefrom a variable loading effect capable of damping out oscillations in the resonant circuit of said oscillator in the absence of a received stereo signal and otherwise enabling said oscillations, said second means including a loading circuit and a diode circuit coupled effectively in series with the loading circuit and also coupled to said amplifier circuit so that said first voltage level reverse-biases the diode circuit and the second voltage level forward-biases the diode circuit;

and means for coupling said loading circuit to said resonant circuit, whereby said oscillations are damped out only when said diode circuit is forward biased.

References Cited by the Examiner

UNITED STATES PATENTS

| | | | |
|---|---|---|---|
| 3,105,117 | 9/1963 | Frank | 179—15 |
| 3,117,186 | 1/1964 | Burdeen et al. | 179—15 |
| 3,122,610 | 2/1964 | Csicsatka | 179—15 |
| 3,133,993 | 5/1964 | DeVries | 179—15 |

OTHER REFERENCES

Browne: British Communications and Electronics, March 1960, pages 204 and 205.

Mergner: "Product Detector for FM-Stereo," Audio. August 1961, pp. 23–25 and 102.

DAVID G. REDINBAUGH, *Primary Examiner.*